No. 627,560. Patented June 27, 1899.
C. H. WHITNEY.
COMBINED PLANTER AND FERTILIZER DISTRIBUTER.
(Application filed Mar. 8, 1899.)

(No Model.) 2 Sheets—Sheet 1.

Witnesses
C. H. McEwen
Arthur Browning

Inventor
Charles H. Whitney
By W. W. Dudley & Co.
his Attorneys

No. 627,560. Patented June 27, 1899.
C. H. WHITNEY.
COMBINED PLANTER AND FERTILIZER DISTRIBUTER.
(Application filed Mar. 8, 1899.)
(No Model.) 2 Sheets—Sheet 2.

Witnesses
C. H. McEwen
Arthur Browning

Inventor
Charles H. Whitney
By W. W. Dudley & Co.
his Attorneys

UNITED STATES PATENT OFFICE.

CHARLES H. WHITNEY, OF COOKEVILLE, TENNESSEE, ASSIGNOR OF ONE-FOURTH TO FRED H. WHITE, OF WHITE, SOUTH DAKOTA.

COMBINED PLANTER AND FERTILIZER-DISTRIBUTER.

SPECIFICATION forming part of Letters Patent No. 627,560, dated June 27, 1899.

Application filed March 8, 1899. Serial No. 708,167. (No model.)

*To all whom it may concern:*

Be it known that I, CHARLES H. WHITNEY, a citizen of the United States, residing at Cookeville, in the county of Putnam and State of Tennessee, have invented certain new and useful Improvements in a Combined Planter and Fertilizer-Distributer; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is directed to improvements in machines in which are combined means for distributing fertilizer and means for planting seed; and the invention has for its object the simplification of this class of combination-machines with a view to economy of construction and durability.

The nature of the invention will be readily comprehended by reference to the following detailed description and to the accompanying drawings, in which—

Figure 1:
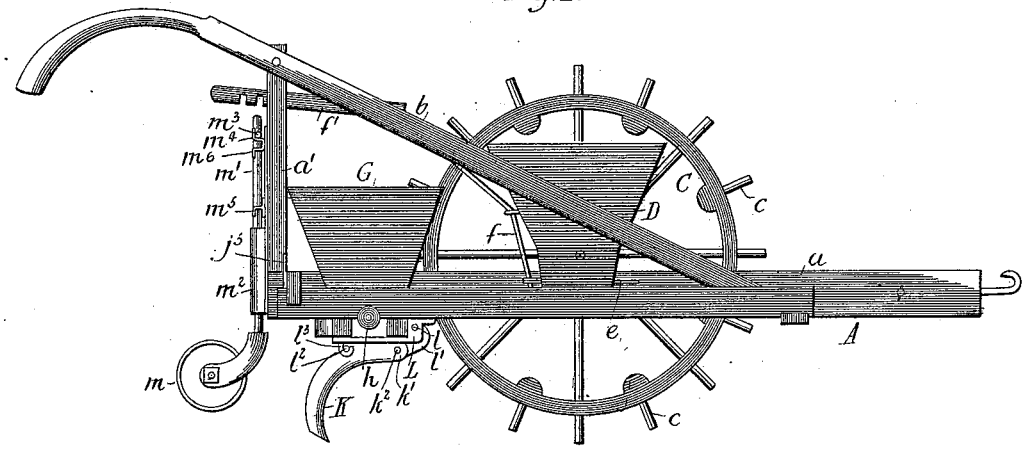
Figure 2:
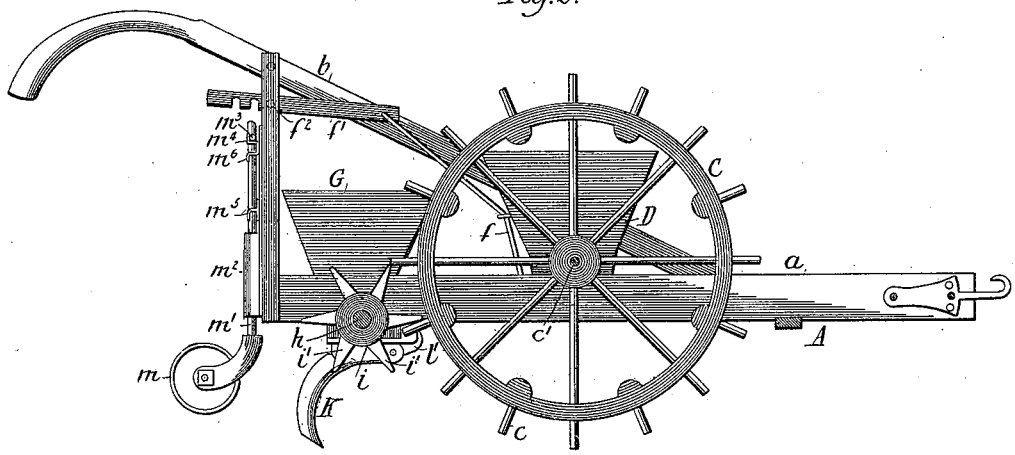
Figure 6:
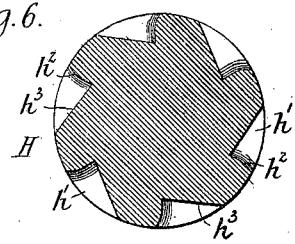
Figure 5:
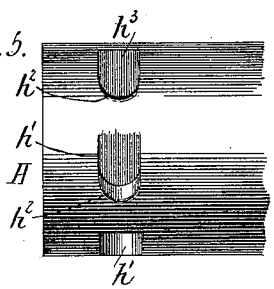
Figure 3:
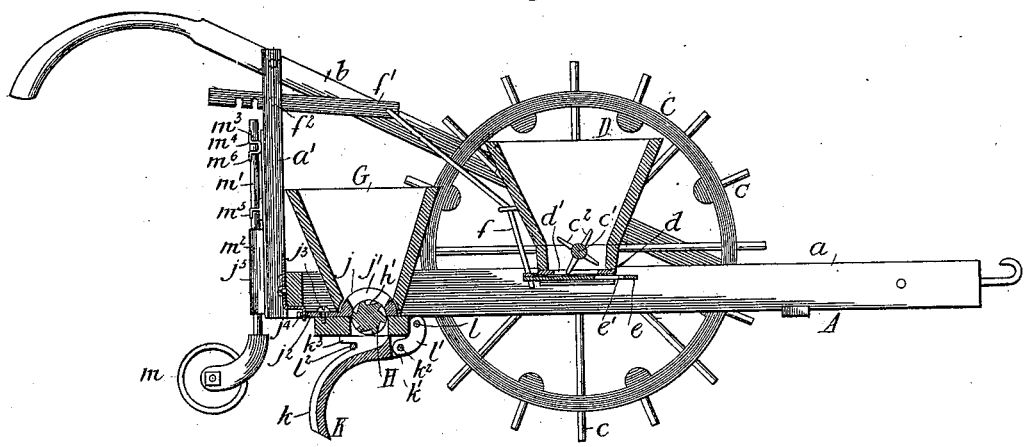
Figure 4:
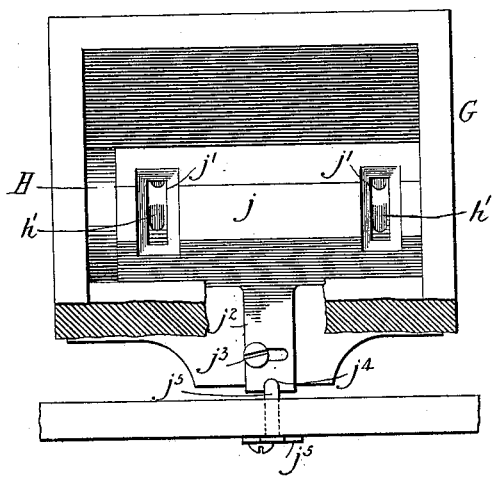

Figure 1 is a side elevation of a combined planter and fertilizer-distributer embodying my invention. Fig. 2 is a central longitudinal sectional view. Fig. 3 is a longitudinal sectional view taken through the hoppers. Fig. 4 is a detail view, partly in section, of a planting-hopper. Fig. 5 is a plan view, and Fig. 6 a sectional view, of the said roll, showing the form of seed-cup.

Referring to the said drawings by letter, A denotes the frame of the machine, having centrally two beams $a\ a$, to the forward end of which is a draft-attaching device and to the rear end of which is a standard $a'$, which supports the handles $b$. Between the beams $a$ is mounted the supporting-wheel C, having teeth $c\ c$ at its periphery, certain of the teeth being preferably extensions of the spokes. This wheel is fixed to a shaft $c'$, journaled in bearings on the beams $a$, and beyond said bearings the shaft enters at each end a hopper D for fertilizer, the shaft carrying blades $c^2\ c^2$ to agitate this material and insure its distribution. In the bottom of each fertilizer-hopper is a plate $d$, through the slots $d'$ of which the contents are discharged, and to control the discharge I provide below the plate $d$ a plate $e$, slidably mounted and having openings $e'$, which are brought more or less in or out of register with the slots $d'$ by the movement of a lever $f$, pivoted to the hopper and engaging at its lower end the plate $e$ and at its upper end a bar $f'$, having on its under side a plurality of recesses any one of which may engage a pin $f^2$ on the standard $a'$ to maintain the adjusted position of the plates $e$.

To the rear of the fertilizer-hoppers are the seed-hoppers G, in the bottom of which are the seed-rolls H. The shaft $h$ of the seed-rolls extends across the frame, being journaled in the beams $a$ and the side frame members, and centrally of the shaft or between the beams $a$ is a pinion $i$, the teeth $i'$ of which are engaged by the teeth $c$ of the wheel C to rotate the seed-rolls, the pinion $i$ being fixed on the shaft. In this manner the operation of the planting devices is effected by the direct engagement of the teeth of the drive or supporting wheel with the pinion on the feed-roll shaft, thereby dispensing with the use of sprocket and other gearing. Above the feed-roll in each seed-hopper is a housing $j$, having slots $j'$, which may be brought more or less in or out of register with the seed-cups to regulate the feed of the seed and, if desired, to cut off said feed completely. To this end there extends rearwardly from the housing an arm $j^2$, slotted to receive a screw $j^3$, by which the housing is guided, and having at its extremity a slot $j^4$, engaged by one end of a bar $j^5$, slidably mounted on the rear frame member. Obviously by moving the bar $j^5$ to one side or the other the housing is slid over the feed-roll to bring the slots into adjustable relation with the seed-cups. In addition to the function of adjustability possessed by the housing, its location with relation to the hopper and seed-roll enables it to assume the weight of the seed, and the roll being thus relieved is free to rotate and will not become clogged.

The seed-rolls are each provided with seed-cups $h'$ of peculiar construction and operation. The base $h^2$ of the cup is rounded, so as to present no corners for the lodgment of seed, and while a portion of the wall of the base is on a line which is radial from the center of the roll the remaining portion of the wall is rounded. The other wall $h^3$ of the cup is at right angles to the straight portion of the base-wall. In operation the seed fall into the base of the cup, and in the rotation of the roll are retained in this portion without danger of becoming jammed and receiving a fracture, which will render them unfit for planting. By reason of the peculiar form of the cup the seed readily fall therefrom when the cup is in its inverted position.

The seed fall from the roll into a passage provided at the rear side of each drill K. The drills are each of curved form, as shown, and the seed-passage, which is lettered $k$, is at the back and is open for the inspection of the operator, who can thus readily ascertain if the feed is regular. Each of the drills is attached at two points to the frame. On the under side of the frame are brackets L, through which is passed a rod $l$, and on this rod are hung links $l'$, which are each connected to the bifurcated upper end $k'$ of the drill by means of a pin $k^2$, of wood or other material which will break under undue strain. $k^3$ is a hook on each drill, which is engaged by a rod $l^2$, supported by hooks $l^3$ on the brackets. By withdrawing the break-pins $k^2$ the drills are detached, and by disconnecting the brackets L the seed-rolls and pinion may be taken out and replaced.

For supporting the drills free of the ground in transporting and turning the machine I provide a caster-wheel $m$, the supporting-rod $m'$ of which is guided in a bracket $m^2$. The rod $m'$ carries an arm $m^3$, which may be turned by foot to engage a stop $m^4$ for supporting the wheel out of contact with the ground or to engage a stop $m^5$ for maintaining the elevated position of the drills by the wheel.

$m^6$ is a stop which may be engaged by the arm $m^3$ to cause the wheel to regulate the depth of the drills.

In the operation of my machine the wheel C is prevented from slipping by the engagement of its teeth with the ground, and said wheel thus has a positive rotation which is directly communicated to the agitators in the fertilizer-hoppers and is communicated by the engagement of its teeth with the teeth of the pinion $i$ to the seed-rolls without the interposition of the usual sprocket or other gearing. The revolving agitators insure the distribution of the fertilizer, and I preferably employ certain of the agitator-blades and extend within the discharge-slots to keep them clear. These blades may also be of such length as to engage and slightly depress the plates $e$, which latter through the movement thus given will loosen the material and insure its discharge regardless of its condition.

By the use of the curved form of drill and the open seed-passage at its rear side I am enabled to secure a continuous feed of seed which is always in full view of the operator. The entrance to the passage in the drill is made of such size as will permit of the drill being shifted to change the distance between rows without the necessity of changing the seed-cups.

I claim as my invention—

1. In a machine of the class described, the combination with a drive-wheel having radial teeth at its periphery to enter the ground, of a pinion mounted in alinement with the drive-wheel the teeth of the pinion engaging the drive-wheel teeth, and distributing devices on the pinion-shaft.

2. In a machine of the class specified, the combination with a drive-wheel having teeth on its periphery, fertilizer-hoppers at the side of the wheel having agitators on the wheel-shaft, seed-hoppers to the rear of the fertilizer-hoppers, seed-rolls in the seed-hoppers, a shaft connecting the rolls, and a pinion on the shaft engaged by the teeth of the drive-wheel.

3. In combination with a hopper having a slotted bottom, a slidable slotted plate loosely mounted at said slot, means for adjusting the plate to control the discharge from the hopper consisting of a lever connected with the plate and with a rod having recesses for engaging a fixed pin, and an agitator having blades which enter the hopper-slot and engage the upper side of the plate and cause it to vibrate for the purpose set forth.

4. In a machine of the class specified, a drill of curved form having an open seed-passage at its rear side and an enlarged opening at the top communicating with said passage, a link connecting the upper forward end of the drill to the frame, and hooks at each side of the opening engaged by a rod supporting the upper rear end of the drill.

5. In a machine of the class specified, a seed-roll having seed-cups each formed with a base-wall curved in cross-section and rounded at its top, and a wall extending from the bottom of the base-wall to the periphery of the roll in a straight line.

In testimony whereof I affix my signature in presence of two witnesses.

CHARLES H. WHITNEY.

Witnesses:
L. GERTRUDE WHITNEY,
R. L. FARLEY.